(12) United States Patent
Hamey

(10) Patent No.: US 7,017,533 B2
(45) Date of Patent: Mar. 28, 2006

(54) ALMOST ZERO COMBUSTION CHAMBER

(76) Inventor: Roy Oliver Hamey, 1010 N. Roosevelt, Liberal, KS (US) 67901

( * ) Notice: Subject to any disclaimer, the term of this patent is extended or adjusted under 35 U.S.C. 154(b) by 840 days.

(21) Appl. No.: 10/120,312

(22) Filed: Apr. 10, 2002

(65) Prior Publication Data

US 2003/0192491 A1    Oct. 16, 2003

(51) Int. Cl.
*F02B 75/04* (2006.01)
(52) U.S. Cl. .................................................. 123/52.2
(58) Field of Classification Search ............. 123/52.2, 123/48 D, 258, 259, 316, 339.11, 78 D, 406.18
See application file for complete search history.

(56) References Cited

U.S. PATENT DOCUMENTS

| | | | | |
|---|---|---|---|---|
| 3,970,056 A | * | 7/1976 | Morris | 123/48 D |
| 4,182,288 A | * | 1/1980 | Thauer | 123/48 D |
| 4,202,300 A | * | 5/1980 | Skay | 123/48 D |
| 4,313,403 A | * | 2/1982 | Bie, Jr. | 123/48 D |
| 4,625,684 A | * | 12/1986 | Van Avermaete | 123/48 D |
| 4,732,115 A | * | 3/1988 | Lapeyre | 123/48 D |
| 4,787,341 A | * | 11/1988 | Chivato | 123/48 D |
| 4,860,711 A | * | 8/1989 | Morikawa | 123/48 D |

* cited by examiner

Primary Examiner—Henry C. Yuen
Assistant Examiner—Jason Benton

(57) ABSTRACT

An internal combustion reciprocation engine conjoined and integrated with a supplementary piston mechanism. The supplementary piston mechanism serves as a storage and return volume for fresh gases to be ignited during the power stroke. Thus, erasing the need for a combustion chamber at top dead center. The storage occurs during the intake or compression stroke through a small volume gaseous communication conduit to the top of supplementary piston mechanism. And is returned to the top of the main power piston during the power stroke through the same small volume gaseous communication conduit. Ignition in the power stroke occurs as the supplementary piston mechanism working in supplementation with the main power piston achieves the proper compression ratio. The high combustion pressure provided by the ignition is then transfered to the the crankshaft through the connecting rod with greater advantage late in the power stroke. AZCC has the capability of being a smaller displacement internal combustion reciprocating engine as compared to prior art internal combustion reciprocating engines with an equal amount of power production. AZCC has the capability to greatly reduce the volumes of gaseous exhaust emissions and increase fuel economy.

2 Claims, 3 Drawing Sheets

Figure - 3

Degree     Sine

Figure 1:
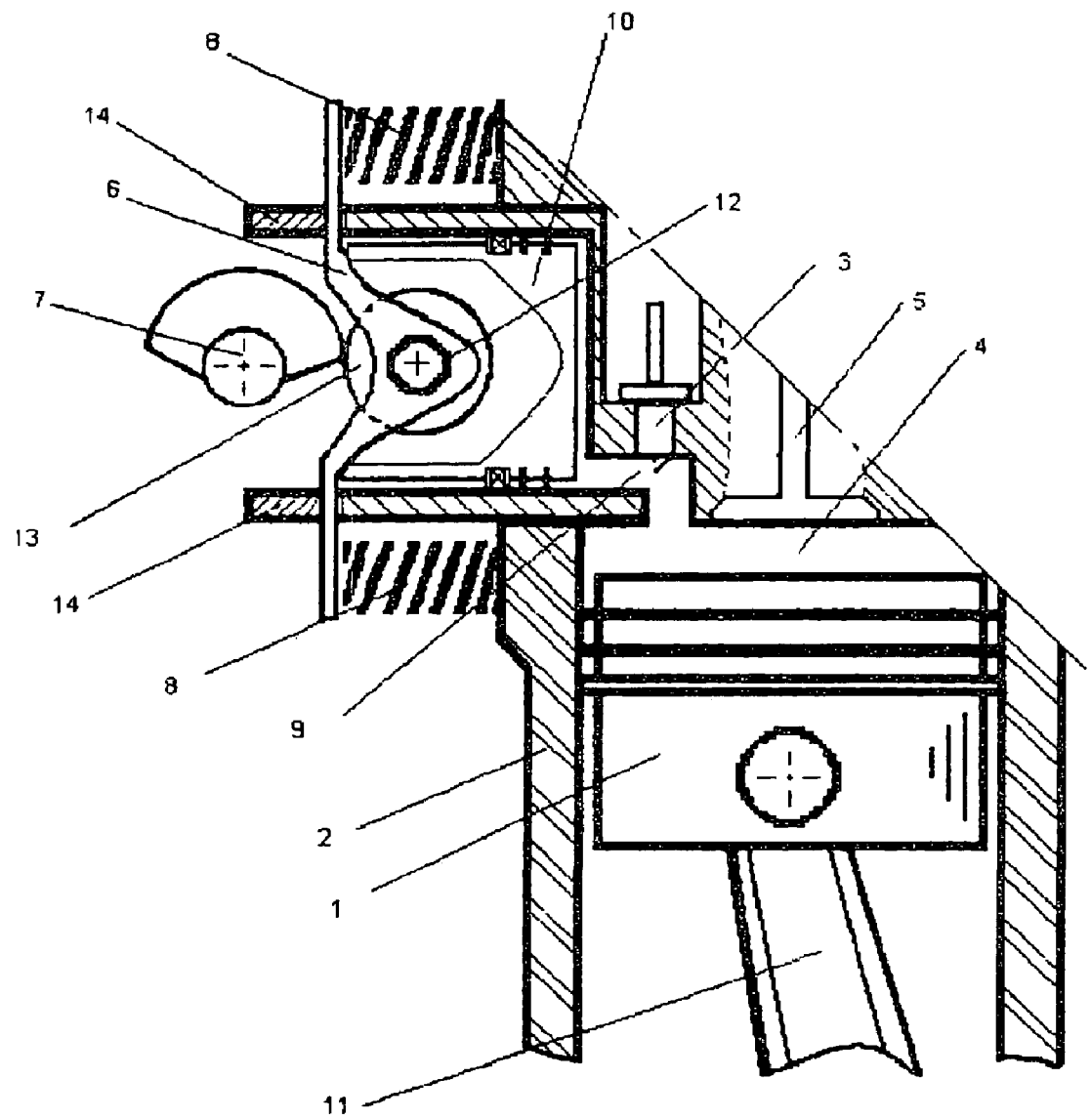

180    =    0 -- prior art combustion  500 psi

170    =    .1736

160    =    .3420

150    =    .5 -- *AZCC combustion  500psi*

140    =    .6428

ALMOST ZERO COMBUSTION CHAMBER

BACKGROUND OF THE INVENTION

1. Field of Invention

This invention is related to Internal Combustion Engines of Reciprocating Piston Type. Gasoline or diesel powered.

2. Description of Related Art

Internal combustion reciprocating piston engines (ICRPE) have combustion chambers that are spaces (volume) made specifically to hold compressed fresh mixture gases in compression, ignite fuel and air mixture at, or near Top Dead Center (TDC) in crankshaft position.

Advances in technology offer excellent ignition and fuel management systems developed by major manufactures of internal combustion engines. The fuels are very well monitored, turned into vapor, and ignited within the confines of a defined combustion chamber at TDC.

The mechanical design deficiencies may not be apparent. The first problem is, the angular relationship of the connecting rod to the crankshaft is not in a good position for the conversion of pressure into torque at TDC. As the main power piston accelerates away from TDC in the power stroke, initial high combustion pressure drops dramatically as volume increases. Where the combustion pressure is the highest the connecting rod and crankshaft relationship can only convert the least. At TDC the Sine of the angle made between the connecting rod and crankshaft is ZERO. And, as the connecting rod and the crankshaft enter into the point of maximum conversion of pressure into torque (approximately 70 degrees after TDC), very little gas pressure is left to be exerted on the crankshaft by the main piston through the connecting rod.

The second problem—power piston displacement in the combustion chamber does not occur. The volume used for the combustion chamber in prior art claims serves to hold fresh mixture gases for compression, combustion and subsequent expansion. ICRPE convert initial combustion pressure into torque through the surface of a main piston onto a connecting rod and onto a connecting rod journal. At 30 degrees ATDC in the power stroke, the combustion chamber in a prior art ICRPE the combustion chamber volume is almost doubled CUTTING the pressure exerted on the main piston in ½.

But, as increased displacement occurs in the combustion chamber, an associated increase in work is obtained from the combustion chamber. The idea of increasing the piston displacement in the combustion chamber began many years ago by milling (machining process wherein the combustion chamber is reduced) the heads or purchasing after market high compression pistons. The increase in compression ratio resulted in an increased displacement in the combustion chamber. However, the effect was a higher temperature of combustion and resultant pressure increases with significant power gains.

The problems created by the higher compression ratio turned into disadvantages. The increased heat and pressure of combustion, increased nitrogen pollution production. And, higher grades of fuel had to be used to combat ignition before TDC. Ignition at TDC with high compression is sensitive. Combustion ignition timing had to be very close to after top dead center. But, close enough to TDC to build the maximum heat during the maximum compression ratio.

Therefore, very little of the high pressure of combustion made close to TDC in prior art systems is converted into torque. Ignition occurs at close to Top Dead Center. The mechanical system relationship, of the angle of the connecting rod to the crankshaft, is at the poorest position to convert pressure into torque at TDC. Every time a prior art ICRPE rotates through the power cycle the combustion chamber volume is lost for the production of power. The amount of fuel lost due to combustion at TDC is tremendous.

In conclusion, both problems of power production relate to each other. Prior art ICRPE exhibit problems in converting initial combustion pressure into power. First, the main power piston displacement in the combustion chamber does not exist. For existing prior art ICRPE to have good piston displacement in the combustion chamber the compression ratio would have to be very high. An example would be 50 to 1 in a gasoline fueled engine. Every time an ICRPE operates through the four cycles, the combustion chamber volume is lost for the production of power. Second, the greatest conversion of initial combustion pressure into torque occurs as the shared center line of the connecting rod bearing and wrist pin centerline at a 90 degree relationship with tire shared main bearing centerline and the rod bearing centerline. At approximately 70 degrees crankshaft position (ATDC) in the power stroke when the mechanical relationship is ready to convert pressure into torque very little combustion pressure is available. Maximum combustion pressure occurs at TDC in prior art ICRPE.

Prior art does not show or tell of the building of the compression ratio and initial combustion pressure inside the power stroke past TDC to convert more of the high pressure of combustion into torque.

The patents below, have been designed to adjust to combustion demands placed upon ICRPE by variable compression ratios. An adjusting or auxiliary piston varies the volume requirements for compression ratio changes. All show maximum initial combustion pressure generated close to TDC.

Morris U.S. Pat. No. 3,970,056 shows a variable compression ratio control system for internal combustion engines in which the adjustable combustion chamber volume ratio is shown to be at TDC and "It is to be understood that with a variable compression ratio of the engine, the compression ratio may be increased for low power operation and decreased for high power operation." Morris shows that his idea has a minimum and maximum specific combustion chamber referred to as compression ratio. The control of the combustion chamber volume is varied by the "combustion space above piston 11 will be increasing or decreasing by the movement of piston 18".

Thaner U.S. Pat. No. 4,182,288 shows an internal combustion engine with combined throttle and compression control and "compression chamber 4" in which gases are compressed into a small fixed volume and "a connecting passage 5 with an auxiliary compression chamber". In Claim 1 "thereby to vary the combined volume of the main and auxiliary compression chambers at compression top dead center" refers to "Preferably, at ¼ load, the auxiliary piston is to reach its top dead center at approximately the same time the main piston reaches the end, that is, top dead center, of its compression stroke." If both pistons arrive at top dead center at the same time during any compression operation, a regular fixed space of combustion that is not displaced by either auxiliary or main piston movement is present. The result is a combustion space or volume close to the main power pistons' slowest piston speed, the maximum pressure of combustion achieved at TDC. The combustion chamber volume is adjustable at TDC.

Skay U.S. Pat. No. 4,202,300 shows an engine with reference to a fixed combustion chamber "62a" ignition at TDC.

Bie, Jr. U.S. Pat. No. 4,313,403 patent shows to have a fixed combustion chamber referred to in about line 35 and receiving and compressing a charge to heat and ignite the fuel.

Van Avermaete U.S. Pat. No. 4,625,684 shows an internal combustion engine with a liquid injector to supply the fuel for combustion into a combustion cylinder with a combustion chamber that has an ignition source (between line 15 to line 20). "A volumetric difference between the cylinders of the combustion chamber" shows the lost volume in having combustion occur close to TDC.

Lapeyre U.S. Pat. No. 4,732,115 shows an internal spark ignition two stroke combustion engine in which a pre-combustion chamber 16c and 17c are used to supply combustion to another combustion chamber used to drive twin pistons in opposite directions.

Chivato U.S. Pat. No. 4,787,341 shows a controlled pressure combustion chamber in which the chamber directly above piston 2, ignition most likely close to TDC.

Morikawa U.S. Pat. No. 4,860,711 shows a combustion chamber directly above piston 2 and has small auxiliary piston to adjust the compression ratio in the fixed combustion chamber.

The many prior attempts have been made to increase the efficiency of internal combustion engines. Some variable compression with variable throttles, some with multiple opposing pistons, some with many moving parts and controlling devices. Enough fuel is not saved. Or the benefit that they provide is not great enough to survive production costs.

Prior art ICRPE show compression into a combustion chamber that may or may not be adjustable. Ignition and initial combustion pressure is obtained very close to TDC in the power stroke of the main power piston.

BRIEF SUMMARY OF INVENTION

A combustion space or volume or chamber no longer exists at TDC of the main power piston.

A combustion space or volume is built After Top Dead Center (ATDC) in the power stroke by a supplementary piston mechanism.

No combustion occurs before or near top dead center.

The fresh mixture gases normally compressed into a combustion chamber are stored by the supplementary piston mechanism during) the intake or compression cycle.

The fresh mixture gases are returned in the power stroke, as the proper compression ratio is achieved by the retracting power piston, by the supplementary piston mechanism in a timely manner through a small volume gaseous communications conduit onto the power piston.

Ignition occurs late in the power stroke.

General Operation

Intake Stroke—supplementary piston is stationary during the intake cycle, or the supplementary piston retracts, intaking fresh gases through a small volume gaseous communications conduit as the intake valve opens. The main power piston retracts and intakes fresh air and fuel mixture.

Compression Stroke—supplementary piston remains retracted, or the supplementary piston is retracting and the main power piston compresses fresh gases into the storage volume through a small volume gaseous communications conduit provided by the supplementary pistons' negative displacement.

Power Stroke—As the main piston accelerates away from the cylinder head, the supplementary piston returns the stored gases via small volume gaseous communications conduit onto the main power piston in timely manner to provide necessary compression ratio of gases for combustion. Initial combustion occurs late—after TDC.

The advantage occurs here in the power stroke.

Note: The main power piston is at TDC and begins to move away from the cylinder head. The acceleration away from the cylinder head provides a combustion volume with a compression ratio. The volume is filled with gases ready to be ignited by the positive displacing motion of the supplementary piston caused by the supplementary cam and cam follower. Initial combustion occurs.

The angular relationship of the connecting rod to the connecting rod journal is now greater (the value of the Sine of the angle is greater) when the initial combustion pressure occurs, production of torque must be greater than in prior art.

Exhaust Stroke—The main power piston push spent gases past the exhaust valve venting into the exhaust manifold. The supplementary piston remains in the extended or positive displacement position.

AZCC supplement piston mechanism enhances an ICRPE by displacing volume in either the intake stroke or compression stroke. If AZCC is added to a stock block with no thought of accommodating AZCC—an increase in displacement happens if the supplementary piston mechanism retracts during the intake stroke. However, if no retraction of the supplementary piston occurs during the intake stroke, but, occurs during the compression stroke when all valves are closed, then, no change in displacement occurs. It, AZCC displacement is added into the intake cycle and compensated with a decrease in main power piston surface area an internal combustion engine having maximum initial combustion pressure exerted further in crank shaft degrees into the power stroke. A greater extraction of torque and subsequent horsepower is possible.

BRIEF SUMMARY OF THE SEVERAL VIEWS OF THE DRAWING(S)

The drawings included,

FIG. 1.—Shows a longitudinal section through a cylinder showing a primary piston and supplementary piston controlled with a cam and follower parts for basic operation. The ICRPE is approximately 30 degrees into the power-stroke. Fuel air mixture is ignited at the appropriate compression ratio over the main power piston.

Figure 2:
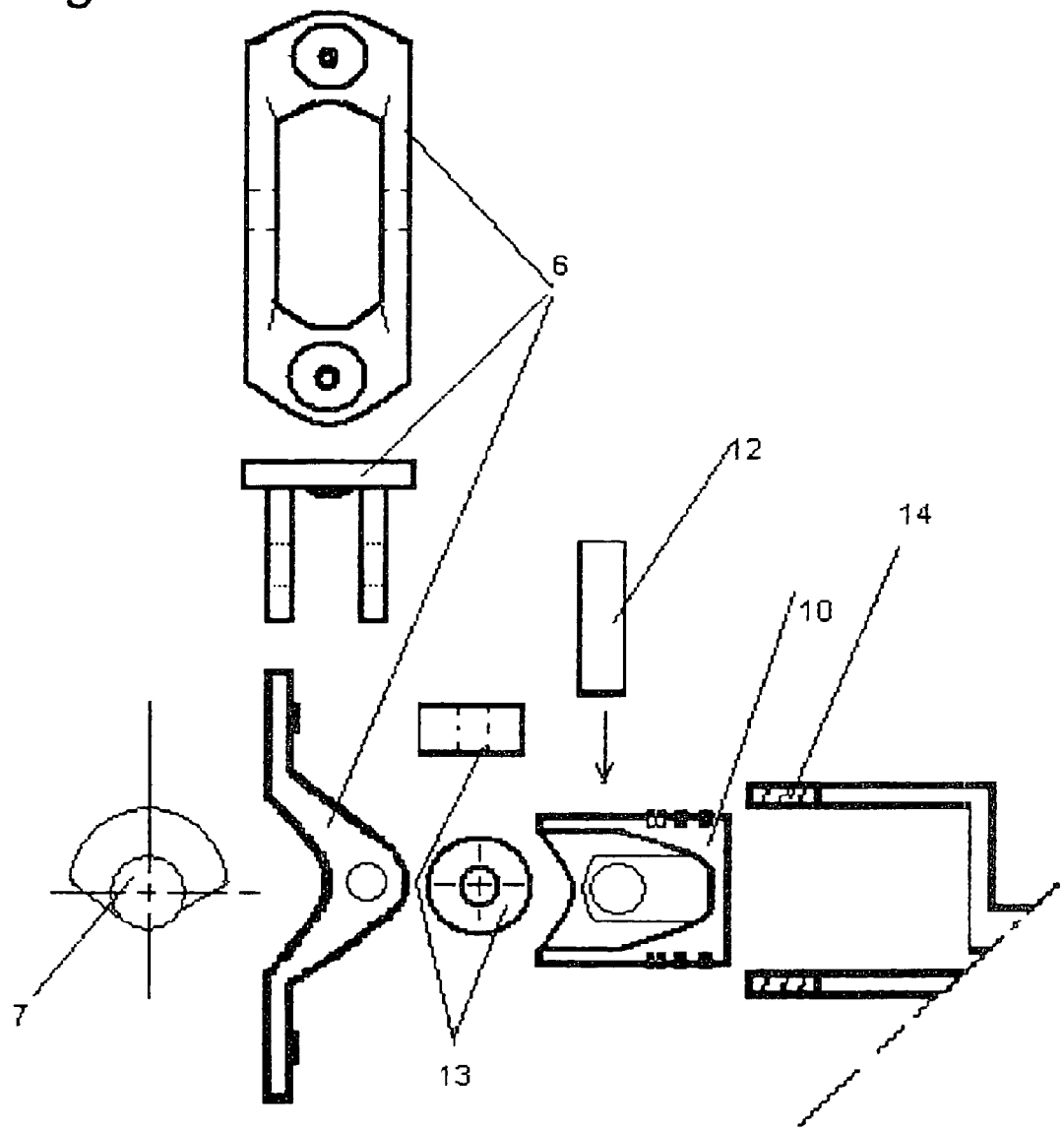

FIG. 2.—Show an explode view of the supplementary piston and control parts. The relationship to each other become more apparent.

FIG. 3.—Shows the approximate degrees of the Sine of the angle formed between the center line of the connecting rod and the center line of the crankshaft main bearing and rod bearing.

DETAILED DESCRIPTION OF INVENTION

The path of the process of the description of AZCC begins with reference to an internal combustion reciprocating piston engine with single or multiple cylinders, typically a four cycle.

Specifications of the basic short block 2 include flat top pistons 1 with the balance of common ICRPE components found in a prior art assembly.

The head assembly is to include no prior art combustion chamber at TDC with the intake 5 and exhaust valve 5 faces flat to match the surface of the main power piston 1 and the flat head surface above the main power piston 1 (FIG. 1).

The common cam shaft timing train for the intake 5 and exhaust valves 5 would then complement the accelerating and deceleration of the main power piston 1 to insure a smooth processing of fuel and air mixture into rotation power without interference for the normal operation of an ICRPE (FIG. 1).

The suitably sized supplementary piston mechanism 10, 12, 13, 14, 6, 7, 8, 9 consists of a supplementary piston 10 activated by a supplementary cam shaft 7 held in constant communication with the supplementary piston assembly 10, 8, 6, 13, 12, 14 and 9 (FIG. 1).

The supplementary piston 10 head surface communicates constantly with the main power piston 1 head surface through a small volume gaseous communication conduit 9 between the supplementary piston 10 and main power piston 1 (FIG. 1).

The supplementary piston 10 gliding and residing into a cylinder, with the supplementary piston mechanism 10, 12, 13, 14, 6, 7, 8 integrated with the cylinder head (FIG. 2).

The supplementary piston assembly includes a supplementary piston 10, wrist pin 12, roller 13 fitted to roll on the wrist pin 12, and follower bracket 6 fits aligned gliding and residing in bracket guides 14 with accompanying compression springs 8, activated by a supplementary cam shaft 7 driven at ½ crankshaft speed (FIG. 1).

The supplementary piston 7 wrist pin 12 attaches a properly fitted roller 13 with inner surface to match in smooth rolling operation to the wrist pin 12 and an outer complementary surface to the supplementary cam shaft 7. The roller 13 resides between the cam follower bracket 6 legs with matching holes for attachment to the wrist pin 12 (FIG. 2).

The supplementary piston wrist pin 12 attaches the cam follower bracket 6 to the supplementary piston 7 through matching holes in the bracket 6 legs to the outside diameter of wrist pin 12 residing in the supplementary piston 10 (FIG. 1).

Compression springs 8 are positioned between the cam follower bracket arms 6 common contact surface and the engine block common contact surface to provide the necessary force to hold the supplementary piston 10 in constant communications with the supplementary cam 7 surface through the wrist pin 12 and the roller 13 as the supplementary cam shaft 7 rotates during operation (FIG. 1).

The cam follower bracket 6 is kept in alignment by the guides 14 residing in opposing sides of the common cylinder wall in sliding perpendicular alignment with respect to the control surface of supplementary cam shaft 7.

The cam follower bracket 6 is held in proper sliding alignment with guides 14 top and bottom positioned in the common cylinder wall in constant harmony to the motion of the cam 7, roller 13, compression springs 8, wrist pin 12, and supplementary piston 10 (FIG. 1).

Prior art internal combustion reciprocating piston common engine management systems are not interrupted with the acceptance of the ignition whereas AZCC requires combustion ATDC.

Coordination of the Internal Combustion Engine Components as Follows:

The intake cycle, beginning at TDC of the main power piston 1. The exhaust valve 5 is fully closed. The supplementary piston 10 mechanism is stationary during the intake cycle, or the supplementary piston 10 mechanism retracts as the intake valve 5 opens with fresh gases being drawn on top of the supplementary piston 10 through the small volume gaseous communications conduit 9. The intake valve 5 opens complementing the acceleration of the main piston 1 away from the common flat surface cylinder head. The main power piston 1 retracts and intakes fresh air and fuel mixture.

At BDC (Bottom Dead Center) of the intake cycle the intake valve 5 is closed sealing the mixture to be compressed.

The compression stroke begins at BDC, the main power piston 1 compresses fresh gases to be ignited into the space or volume provided by the retracted or retracting supplementary piston 10 mechanism to be stored for combustion ATDC through a small volume gaseous communication conduit 9. As the main power piston 1 closely approaches TDC of the compression stroke the supplementary cam 7 and cam follower 6,6, 12, 13, 14 begin to activate the supplementary piston 10 in positive displacement to complement the desired compression ratio in the power stroke.

The power stroke be ins at TDC, the main power piston 1 begins to accelerate away from the common flat surface cylinder head, the supplementary piston 10 activated by the supplementary cam 7 empties the stored volume of gases in timely manner through the small volume gaseous communication conduit 9 to be ignited onto the main power piston 1. The appropriate combustion ratio volume is accomplished over the main power piston 4. Ignition 3 (spark-plug in gasoline engine) is initiated at the appropriate interval to insure complete combustion and proper initial combustion pressures late ATDC.

The advantage occurs here in the power stroke.

Note: The main power piston 1 is at TDC and begins to accelerate away from the flat cylinder head. The power piston 1 acceleration away from the cylinder head provides a combustion volume 4. The volume 4 is filled with gases through the small volume gaseous communications conduit 9 ready to be ignited. The displacing motion of the supplementary piston 7 caused by the supplementary cam 7 and cam follower assembly 6,8, 12, 13, 14 working in supplementation with the main power piston gives the proper compression ratio. Initial combustion occurs late ATDC.

The power stroke ends at close to BDC as the power piston 1 decelerates, the supplementary piston 7 remains in an extended position displacing volume.

The exhaust stroke begins at close to BDC as the main power piston 1 vents exhaust gases through an open exhaust valve 5. Completion of the exhaust cycle ends as the exhaust valve 5 closes in harmony with the main power piston deceleration at TDC.

AZCC supplements an ICRPE by displacing volume in either the intake stroke or compression stroke. If AZCC is added to a stock block with no thought of accommodating AZCC volume displacement—an increase in total ICRPE displacement happens if the supplementary piston 10 is retracted during the intake stroke. However, if no retraction of the supplementary piston 10 occurs during the intake stroke, but, occurs during the compression stroke when all valves 6 are closed, then, no change in total ICRPE displacement occurs. If AZCC displacement is maximized, added into the intake cycle, and compensated with a decrease in main power piston surface area, an internal combustion engine could be made to have maximum initial combustion pressure exerted further in degrees into the power stroke to extract even more torque and subsequent horsepower. The options are almost endless!

When an engine is being built with AZCC to be compared against a prior art internal combustion engine, the AZCC engine must have a smaller cubic inch displacement. The reason AZCC will have to be smaller in displacement is because the maximum initial combustion pressure 4 is achieved at about 30 degrees ATDC in the power stroke. The Sine of the angle made between the connecting rod 11 center line and the rod journal and crankshaft main centerline multiplied by the amount of force the surface area the power piston 1 generates is very close to the amount of force transmitted into the crankshaft rod journal. The angular relationship of the connecting rod 11 to the crankshaft is close to converting ½ of the force into the crankshaft (Sine 30 degree) at maximum combustion pressure. The amount of torque AZCC produces is approximately twice as great. The prior art ICRPE build maximum initial combustion pressure at Top Dead Center which causes lost combustion chamber volume. The maximum force delivered to the crankshaft by a prior art engine is low as compared to AZCC. See FIG. 3.

The invention claimed is:

1. A common diesel or gas cycle engine comprising:

an engine block, at least one cylinder, a crankshaft, a valve train, and a cylinder head, said cylinder head surface being flat and defining as upper boundary of a primary combustion chamber, each of the at least one cylinder having a primary piston reciprocating therein, said primary piston having a flat head surface and defining a lower boundary of the primary combustion chamber, said primary combustion chamber being defined as the area between the flat cylinder head surface and flat piston head surface, intake and exhaust port affixed in the cylinder head with intake and exhaust valves having intake and exhaust valve heads, said intake and exhaust valve heads being flush with the surface of the cylinder head when the intake and exhaust valves are closed, the flat head surface of the primary piston approaching the flat cylinder head surface, so as to result in substantially zero combustion space in the primary combustion chamber at the top dead center position of the engine stroke, a supplemental piston chamber, a supplemental piston, having a flat head surface and reciprocating within the supplemental piston chamber, a conduit connecting the primary combustion chamber and the supplemental piston chamber, a supplemental camshaft, supplemental piston with flat piston head, supplemental wrist pin, supplemental wrist pin keepers, supplemental wrist pin roller, and a supplemental cam follower with bracket and springs, comprise a supplemental piston mechanism, said supplemental piston mechanism is powered by said crankshaft through said valve train, said supplemental wrist pin roller communicates motion from the supplemental camshaft to the supplemental piston, the supplemental cam follower has bracket legs, which straddle the roller, and resides on the supplemental wrist pin; and an upper surface, holding compression springs, forces a wrist pin roller in constant communication between the supplemental piston and supplemental camshaft.

2. An engine according to claim 1 further comprising:

The supplemental piston mechanism stores an air-fuel mixture during the intake and/or compression stroke, and returns the air-fuel mixture after the top dead center position of the power stroke, Ignition of the air-fuel mixture occurs at approximately 5 degrees revolution after top dead center in the power stroke.

* * * * *